(12) United States Patent
Daiker et al.

(10) Patent No.: US 9,103,251 B2
(45) Date of Patent: Aug. 11, 2015

(54) DEVICES AND METHODS FOR COMPLIANT AFTERTREATMENT COMPONENT ASSEMBLY

(71) Applicant: Cummins Inc., Columbus, IN (US)

(72) Inventors: Jeff D. Daiker, Elizabethtown, IN (US); Gregory R. White, Columbus, IN (US); Thomas Meyers, Greenwood, IN (US); Jose Palacios, Stoughton, WI (US); Michael J. Welp, Stoughton, WI (US); Richard Thielmeyer, Greenwood, IN (US); Alfred Schuppe, Columbus, IN (US)

(73) Assignee: Cummins Inc., Columbus, IN (US)

( * ) Notice: Subject to any disclaimer, the term of this patent is extended or adjusted under 35 U.S.C. 154(b) by 283 days.

(21) Appl. No.: 13/740,557

(22) Filed: Jan. 14, 2013

(65) Prior Publication Data

US 2013/0186070 A1    Jul. 25, 2013

Related U.S. Application Data

(60) Provisional application No. 61/590,534, filed on Jan. 25, 2012.

(51) Int. Cl.
| | |
|---|---|
| *F01N 3/00* | (2006.01) |
| *F01N 3/08* | (2006.01) |
| *F01N 9/00* | (2006.01) |
| *F01N 11/00* | (2006.01) |
| *F02D 41/02* | (2006.01) |

(52) U.S. Cl.
CPC .. *F01N 3/08* (2013.01); *F01N 9/00* (2013.01); *F01N 11/00* (2013.01); *F01N 2260/24* (2013.01); *F01N 2550/24* (2013.01); *F02D 41/0235* (2013.01); *Y02T 10/47* (2013.01)

(58) Field of Classification Search
CPC ............. F01N 3/08; F01N 9/00; F01N 11/00; F01N 2260/24; F02D 41/0235
USPC ..................... 60/274, 282; 73/114.69, 114.75
See application file for complete search history.

(56) References Cited

U.S. PATENT DOCUMENTS

| | | | |
|---|---|---|---|
| 5,502,360 | A | 3/1996 | Kerkman et al. |
| 5,629,628 | A | 5/1997 | Hinds et al. |
| 6,227,931 | B1 | 5/2001 | Shackelford |

(Continued)

FOREIGN PATENT DOCUMENTS

| | | |
|---|---|---|
| EP | 2065581 A1 | 6/2009 |
| EP | 2192532 A2 | 6/2010 |
| JP | 2003 262114 | 9/2003 |

OTHER PUBLICATIONS

Search Report and Written Opinion, PCT/US2013/022669, EP Searching Authority, Cummins Inc., Aug. 20, 2013.

(Continued)

*Primary Examiner* — Jason Shanske
(74) *Attorney, Agent, or Firm* — Taft Stettinius & Hollister LLP

(57) ABSTRACT

A controller is configured to receive an input signal from a connection device of one or more aftertreatment components in an aftertreatment system for an internal combustion engine. The controller determines from the signal(s) whether the one or more aftertreatment components are properly installed for a particular aftertreatment system associated with the engine.

19 Claims, 6 Drawing Sheets

(56) References Cited

U.S. PATENT DOCUMENTS

| | | |
|---|---|---|
| 6,325,483 B1 | 12/2001 | Harbour et al. |
| 6,529,691 B2 | 3/2003 | Guy et al. |
| 6,650,847 B2 | 11/2003 | Guy et al. |
| 7,108,357 B2 | 9/2006 | Rice et al. |
| 7,434,053 B2 | 10/2008 | Parry et al. |
| 7,500,121 B2 | 3/2009 | Langer |
| 7,693,648 B2 | 4/2010 | Klein et al. |
| 2003/0234655 A1* | 12/2003 | Sarma et al. ............ 324/663 |
| 2006/0153761 A1* | 7/2006 | Bandl-Konrad et al. .. 423/239.1 |
| 2008/0149483 A1* | 6/2008 | Robison ............ 204/424 |
| 2009/0138185 A1* | 5/2009 | Klein et al. ............ 701/114 |
| 2009/0198464 A1* | 8/2009 | Clarke et al. ............ 702/82 |
| 2009/0229343 A1* | 9/2009 | Ishiguro et al. ............ 73/23.31 |
| 2009/0293963 A1* | 12/2009 | Busato et al. ............ 137/511 |
| 2009/0315258 A1* | 12/2009 | Wallace et al. ............ 273/238 |

OTHER PUBLICATIONS

International Application No. PCT/US2013/022669, International Preliminary Report on Patentability, Jul. 29, 2014, 5 pages.

* cited by examiner

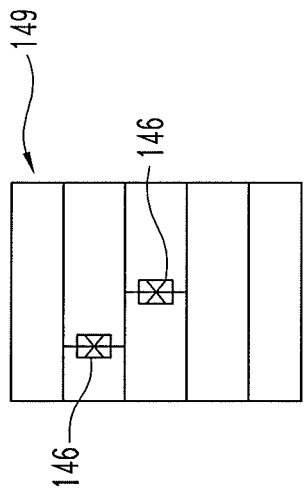
Fig. 6B
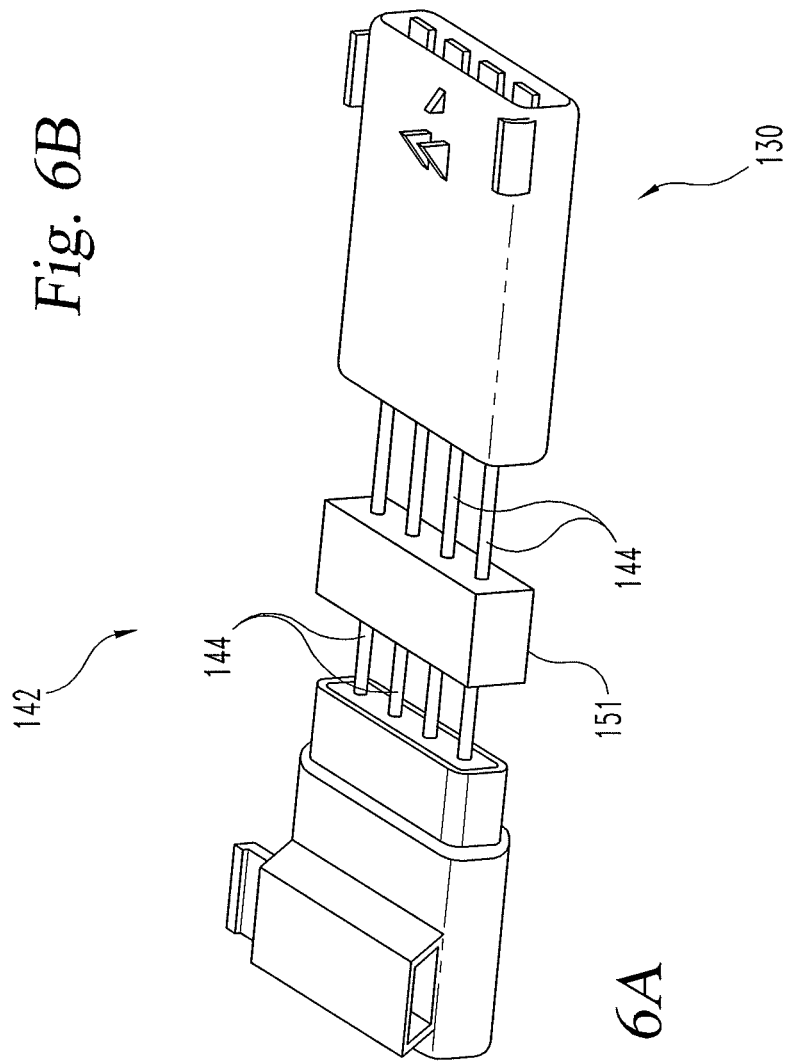
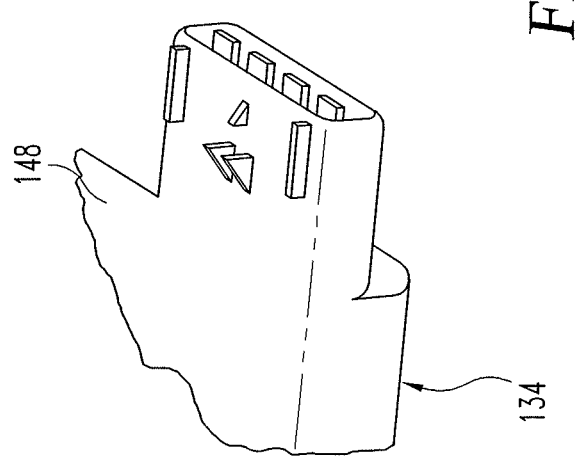
Fig. 6A

DEVICES AND METHODS FOR COMPLIANT AFTERTREATMENT COMPONENT ASSEMBLY

CROSS-REFERENCE TO RELATED APPLICATION

This application claims the benefit of the filing date of provisional application Ser. No. 61/590,534 filed on Jan. 25, 2012, which is incorporated herein by reference.

BACKGROUND

The present invention generally relates to aftertreatment systems for internal combustion engines, and more particularly, but not exclusively, relates to devices and methods for determining and indicating compliant aftertreatment component and internal combustion engine assemblies.

Aftertreatment systems generally include several emissions reducing devices. However, the various emissions reducing devices may be provided by different manufacturers, and even if provided by one manufacturer, the assembly of the aftertreatment system with a particular engine may be performed by yet another company. Under certain conditions, the EPA may require proof that the assembly has been done in a way that complies with certification. Some existing systems have various shortcomings relative to certain applications and difficulties in ascertaining and ensuring compliance when assembled. Accordingly, there remains a need for further contributions in this area of technology.

SUMMARY

One embodiment of the present disclosure is a unique system and method for determining whether one or more components of an aftertreatment system are compliant with an internal combustion engine to which the aftertreatment system is assembled. Other embodiments include apparatuses, systems, devices, hardware, methods, and combinations for an aftertreatment and internal combustion engine system. Further embodiments, forms, features, aspects, benefits, and advantages of the present application shall become apparent from the description and figures provided herewith.

BRIEF DESCRIPTION OF THE DRAWINGS

The description herein makes reference to the accompanying figures wherein like reference numerals refer to like parts throughout the several views, and wherein:

FIG. 6A is a partially exploded perspective view diagram of another embodiment of a connection device and junction box for a sensor.

FIG. 6B is a schematic of an aftertreatment component indicator of the connection device of FIG. 6A.

DETAILED DESCRIPTION OF THE ILLUSTRATED EMBODIMENTS

Figure 1:
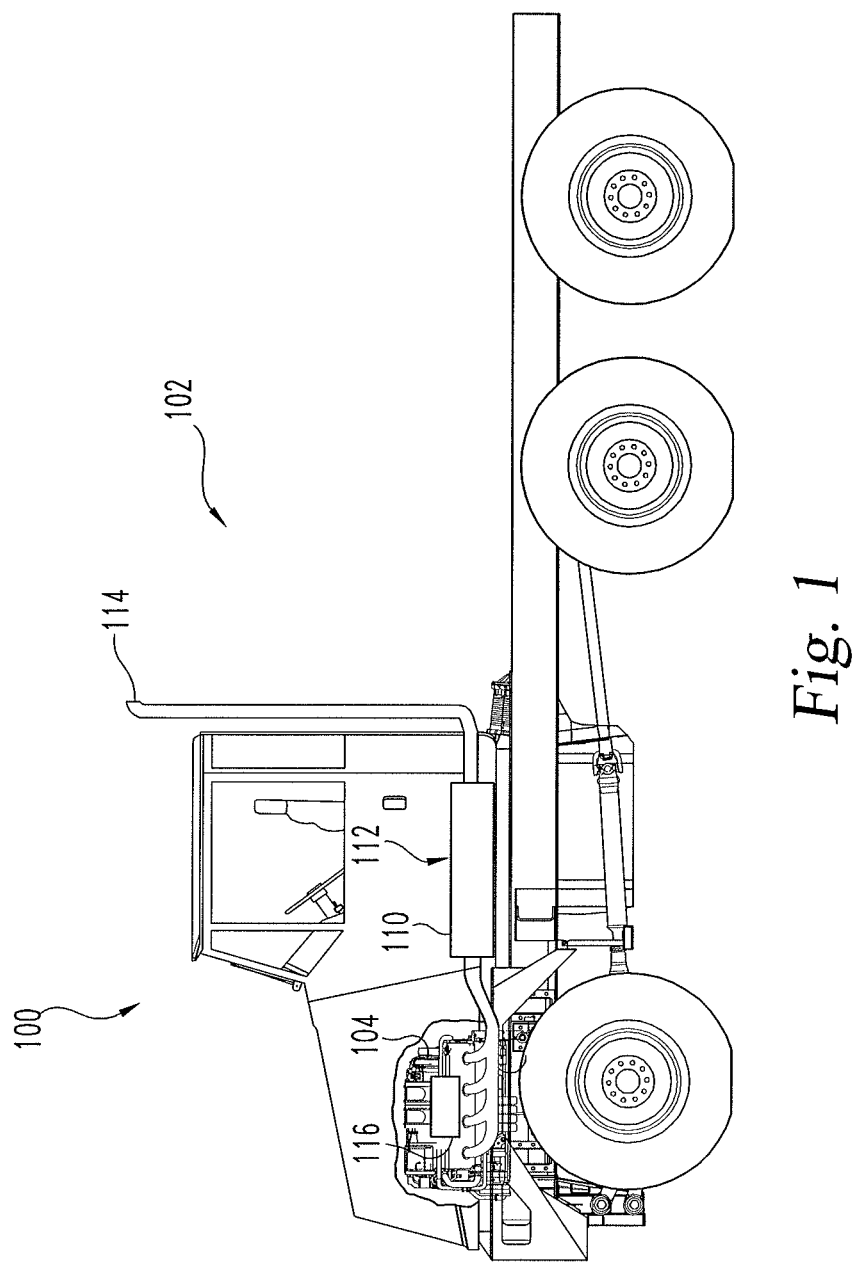
FIG. 1 is a schematic diagram of a vehicle including an internal combustion engine and an aftertreatment system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 is a schematic diagram of a system 100. The system 100 includes a vehicle 102 having an internal combustion engine 104. The vehicle 102 may be any type of vehicle that utilizes an engine including, but not limited to, locomotives, aircraft, trucks, automobiles, tractors, and construction equipment, for example. Systems 100 which utilize a stationary platform are also contemplated, such as a generator set. In one embodiment, internal combustion engine 104 is a reciprocating piston type engine that operates on diesel fuel; however, in other embodiments engine 104 and/or fueling may be of a different type. For example, the engine 104 may be any type of internal combustion engine such as diesel, gasoline, natural gas, gas turbine, microturbine, or any other type of engine or power plant that utilizes an aftertreatment system.

The vehicle 102 may also include an exhaust system 110 for the engine 104. Operation of the engine 104 produces exhaust gasses that flow through and are treated in the exhaust system 110 before being released to the atmosphere. Exhaust system 110 includes aftertreatment system 112 to remove/convert undesirable constituents in the exhaust prior to release through discharge outlet 114. The vehicle 102 also includes a controller 116, such as an Electronic Control Module (ECM), to control operation of the engine 104 and the aftertreatment system 112.

Figure 2:
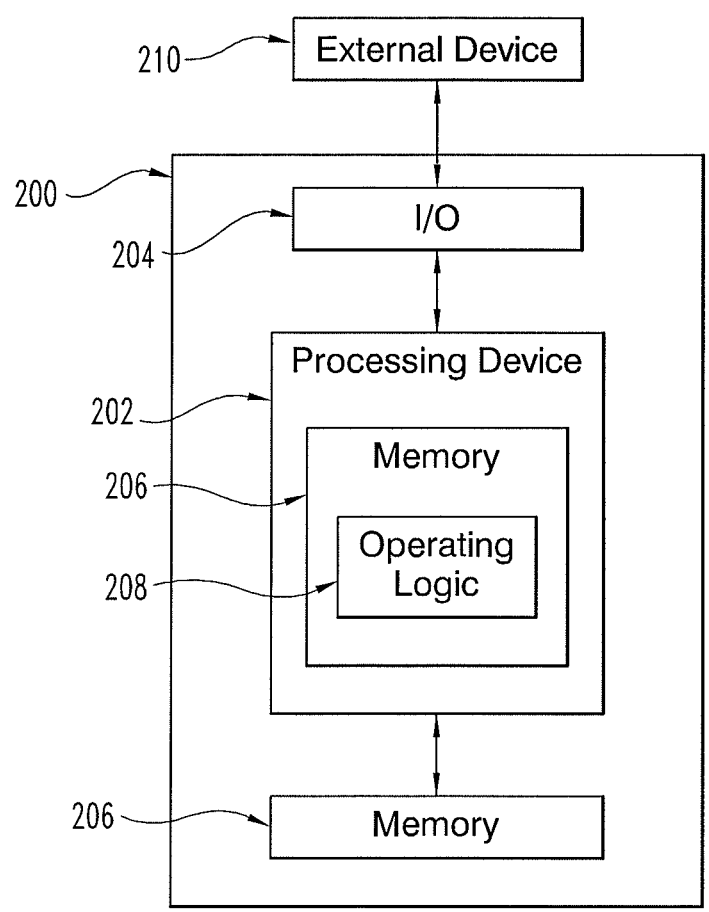
FIG. 2 is a schematic diagram of a controller.

FIG. 2 is a schematic diagram of a controller 200. The controller 200 may be the controller or ECM 116 or a second device. Controller 200 includes a processing device 202, an input/output device 204, memory 206, and operating logic 208. In other embodiments, controller 200 may take other forms. Furthermore, in some embodiments, controller 200 may communicate with one or more external devices 210.

The input/output device 204 may be any type of device that allows the controller 200 to communicate with the external device 210. The input/output device 204 may be comprised of hardware, software, firmware, and/or state machines.

The external device 210 may be any type of device that allows signals or data to be inputted to or outputted from the controller 200. For example, the external device 210 may be a handheld diagnostic device, a computer, a junction box, a wiring harness, a connector, an indicator, engine control devices, and/or various sensors including, but not limited to, temperature sensors, oxygen sensors, and/or NOx sensors. It is further contemplated that there may be more than one external device in communication with the controller 200.

Processing device 202 can be of a programmable type, a dedicated, hardwired state machine, or a combination of these; and can further include multiple processors, Arithmetic-Logic Units (ALUs), Central Processing Units (CPUs), or the like. For forms of processing device 202 with multiple processing units, distributed, pipelined, and/or parallel processing can be utilized as appropriate. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output device 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a mixture of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

Figure 3:
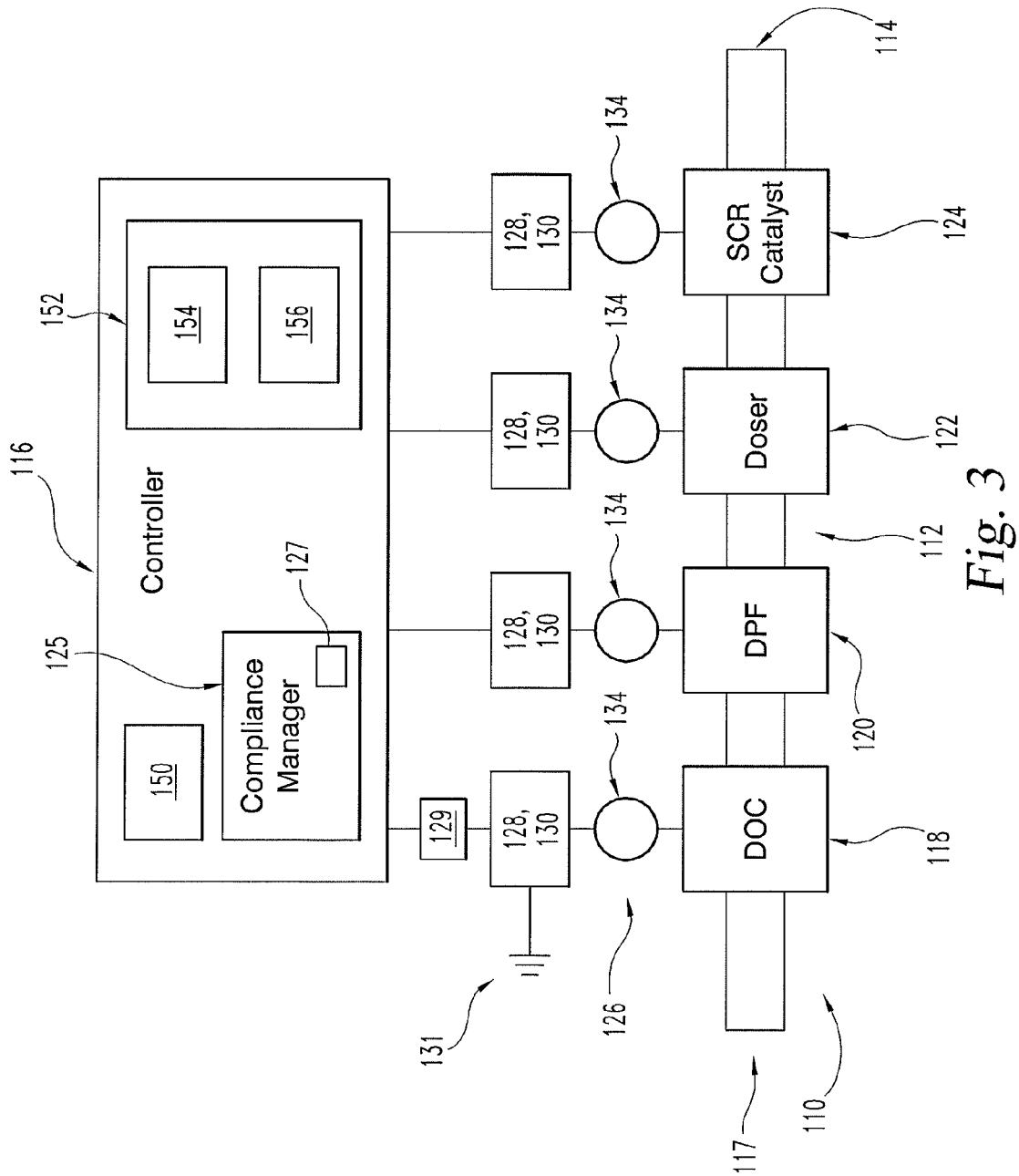
FIG. 3 is a schematic diagram of a controller and an aftertreatment system.

FIG. 3 is a schematic diagram of the controller 116 and aftertreatment system 112. An exhaust flow path 117 of the exhaust gas stream from the internal combustion engine 104 is shown with the exhaust system 110. In one form, the flow path 117 from the engine 104 is arranged such that the exhaust gas stream enters a diesel oxidation catalyst (DOC) 118 first, to reduce carbon monoxide (CO) and hydrocarbons (HC) present in the exhaust gas stream. In other embodiments, the diesel oxidation catalyst 118 may not be the first aftertreatment device to which the exhaust gas is exposed.

In one form, the exhaust flow path 117 continues to a diesel particulate filter (DPF) 120, which reduces the amount of particulates and/or soot in the exhaust gas stream. After the diesel particulate filter 120, a doser such as a diesel exhaust fluid (DEF) injection device 122 may inject a DEF into the exhaust gas stream. Any suitable reductant may be used, such as urea. The flow path 117 continues to selective catalytic reduction (SCR) catalyst 124. The DEF and the exhaust gas stream react with the SCR catalyst 124 to reduce NOx (e.g., nitric oxide and nitrogen dioxide). It is contemplated that some of the exhaust flow path may be used for exhaust gas recirculation, and may include a turbocharger such as a VGT, and other exhaust system and aftertreatment components (not shown).

The ECM 116 includes a compliance manager 125 that receives input signals from sensor arrangement 126. Sensor arrangement 126 is coupled to ECM 116 by suitable signal communication pathways that include one or both of a first connection device 128 or a second connection device 130. Sensor arrangement 126 includes one or more sensors 134 such as temperature sensors, oxygen sensors, and/or NOx sensors that provide an input signal corresponding to a measurement from the corresponding aftertreatment component 118, 120, 122, 124 of the aftertreatment system 112 or in proximity thereto. For example, sensors 134 may be located before or after a component such as at an inlet or outlet, or located on or within a component. Furthermore, it is contemplated that each of the aftertreatment components 118, 120, 122, 124 can each have one or more sensors 134.

Figure 4:
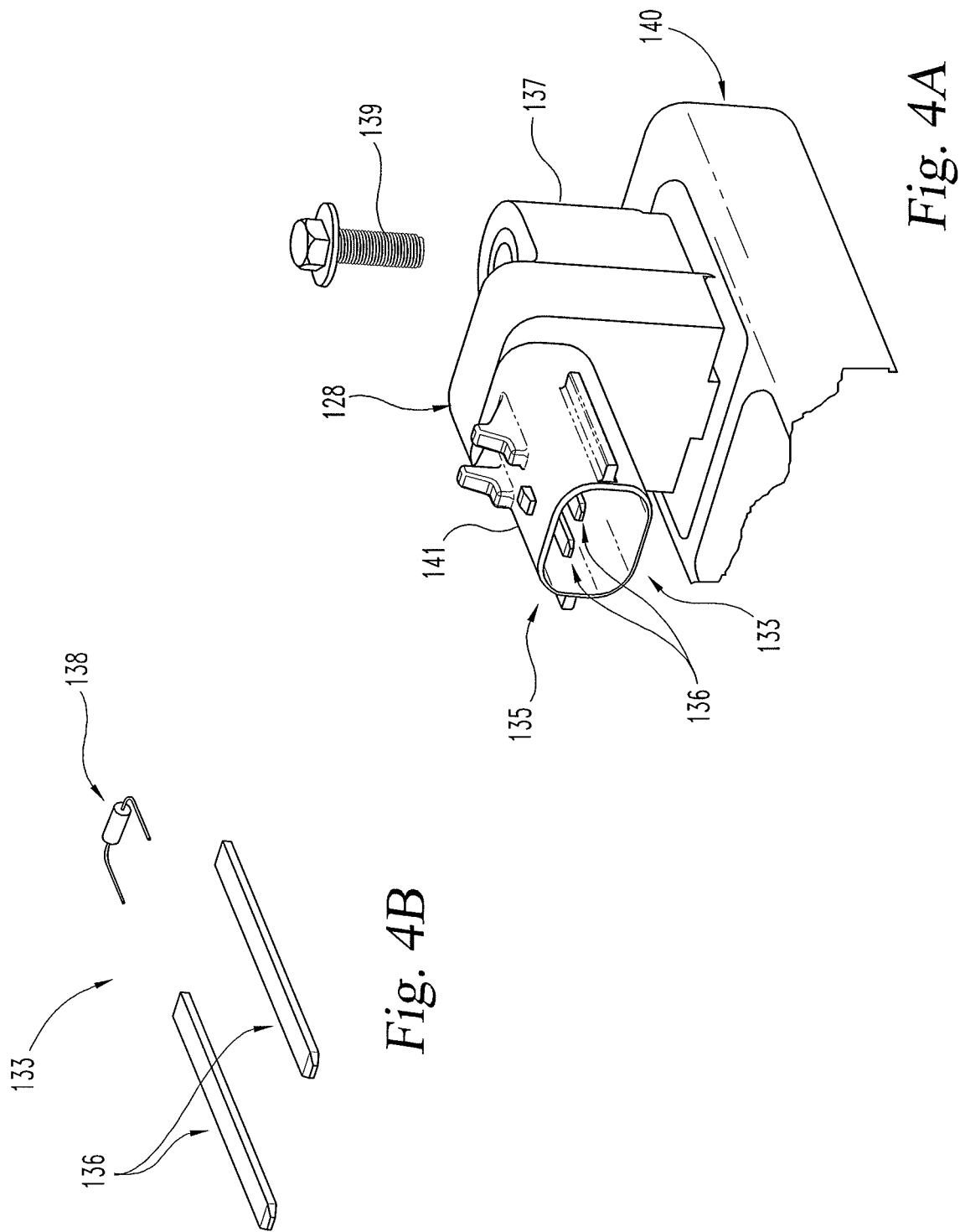
FIG. 4A is a partially exploded perspective view of one embodiment of a connection device and mounted to a junction box of a sensor.
FIG. 4B is an exploded view of an aftertreatment component indicator of the connection device of FIG. 4A.
Figure 5:
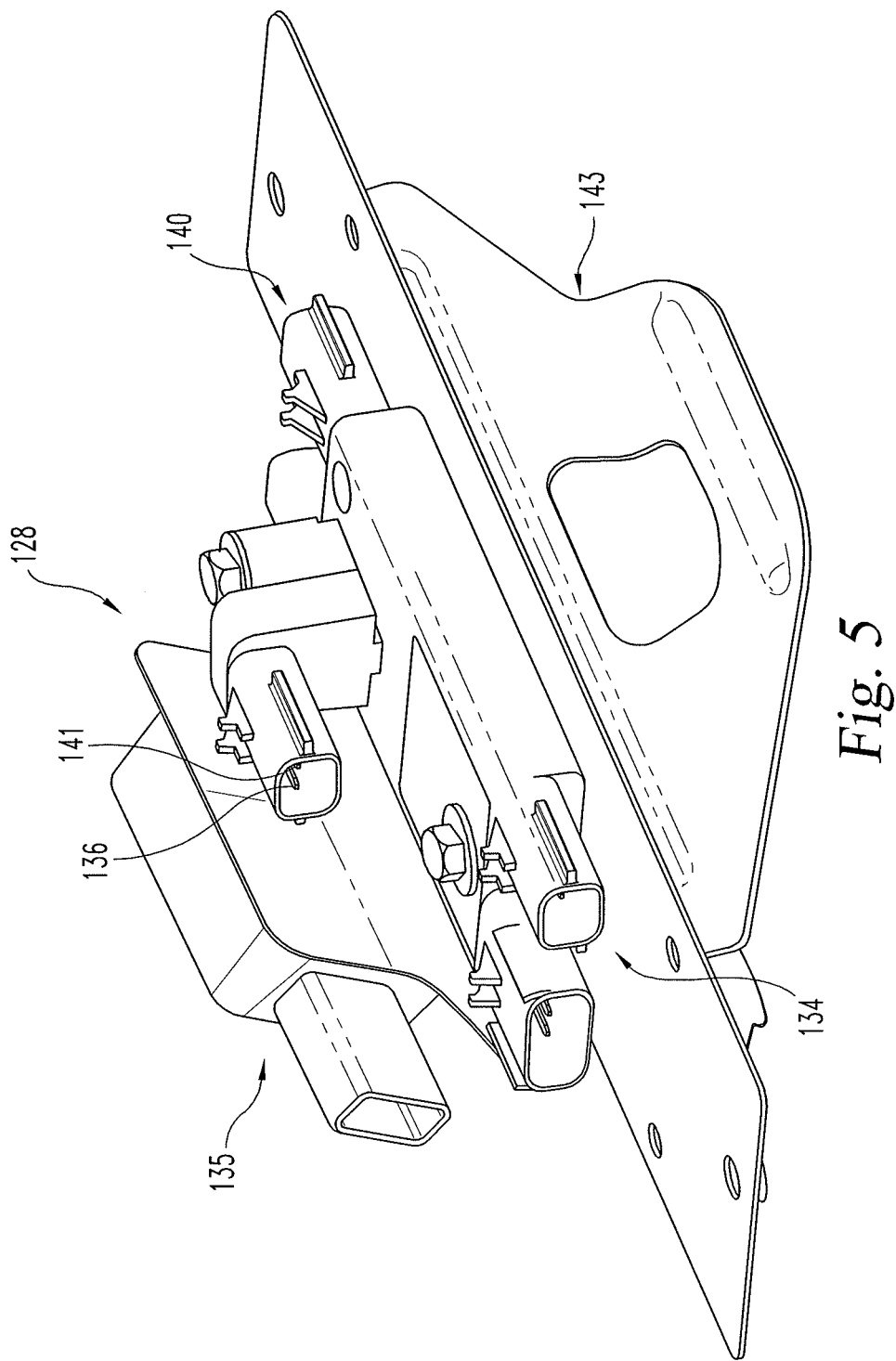
FIG. 5 is another perspective view of the connection device of FIG. 4A mounted to the sensor and a housing of the sensor.

In one embodiment, as shown in FIGS. 4A, 4B and 5, the first connection device 128 includes a connector 135 that is assembled to a junction box 140 of the sensor 134 associated with one of the aftertreatment components 118, 120, 122, 124. Connector 135 includes a mounting portion 137 that receives a fastener 139 to secure connector 135 to junction box 140. Connector 135 further includes an adapter 141 that houses an indicator device 133 including terminals 136 and resistor 138. Sensor 134 can be mounted to a bracket 143 or other device that is mounted on or near the associated aftertreatment component 118, 120, 122, 124.

As further shown in FIG. 4B, indicator device 133 includes terminals 136 with one or more resistors 138 electrically connected at an end of each of the terminals 136. The one or more resistors 138 of connection device 128 includes a unique resistance value that is matched with and identifies a unique component of aftertreatment system 112 on which sensor 134 and connection device 128 is installed. As shown in FIG. 3 with respect to the connection device 128 mounted to DOC 118, terminals 136 of connection device 128 are electrically connected to an engine/OEM interface connector 129 and to the vehicle ground 131. An electrical connection is also made from the engine/OEM interface connector 129 to the ECM 116 so that resistance value from connection device 128 are communicated to the ECM 116. In other embodiments, connection device 128 can be electrically connected directly to the ECM 116 such as shown in FIG. 3 with respect to the other aftertreatment components 120, 122, 124.

The compliance manager 125 is operable to electrically read the value of this unique resistance indicated by indicator device 133 of connection device 128 and its associated aftertreatment component and confirm the correct component of aftertreatment system 112 has been installed for the particular engine 104, providing a confirmation that vehicle 102 includes an emission compliant aftertreatment assembly for the engine 104. If a resistance value is read that does not indicate the associated aftertreatment component is approved for the particular engine 104, a fault code 150 is enabled alerting the assembler that the aftertreatment system 112 is not assembled in a compliant manner for the engine 104.

In one embodiment, the ECM 116 includes a table 152 of resistance values 154 corresponding to part numbers of the various aftertreatment components that can be used in an aftertreatment system 112. Compliance manager 125 is programmed or calibrated with a list or table 127 of part numbers of components 118, 120, 122, 124 of aftertreatment system 112 that are approved for the particular size and type of engine 104 to which ECM 116 is associated for operation. The determined part number from table 152 is then compared to the list of acceptable part numbers in table 127 to determine if the particular component associated with the determined part number is approved. A determination that each of the components 118, 120, 122, 124 for aftertreatment system 112 for the particular engine 104 is approved ensures a compliant aftertreatment assembly 112. If one or more of components 118, 120, 122, 124 is not approved a fault code 150 can be provided.

In another embodiment, as shown in FIGS. 6A and 6B, the second connection device 130 includes an indicator device 149 that is housed in a housing 151 of a connector or wiring harness 142. Harness 142 includes terminals or wires 144 for connecting sensor 134 of, for example, a DPF 120 or SCR catalyst 124, to ECM 116 through indicator device 149. The connection device 130 may be also included with or be attached to a junction box 148 in parallel with the sensor 134 associated with the aftertreatment component.

In the illustrated embodiment of FIG. 6B, indicator device 149 includes one or more capacitors 146 that are electrically connected to the wires 144. The capacitors 146 are included in a 4-pin device housing 151 between the wire harness 142 and junction box 148. In another embodiment, the device 149 could be a 2-pin component and housing in which there are two wires and one capacitor 146 comprising the indicator device 149. Other configurations of the indicator device 149 are contemplated, including those that include more or less pins.

In still another embodiment, sensor 134 includes a connection device in the form of a module formed as a part of or connected to the sensor 134. The connection device module reads temperature or other information regarding the DOC/DPF and/or SCR catalyst from the sensor and transmits the information over a digital network, such as a CAN, to the ECM. The module includes an indicator device in the form of programmable digital electronics programmed with a code that identifies the engine 104 and/or aftertreatment system 112 to which the particular aftertreatment component is to be connected. When the aftertreatment component with the programmed sensor module is installed with the vehicle, the ECM reads this programmed identification code as an input signal via the CAN, compares it to the expected code or value in the ECM calibration, and determines whether or not the aftertreatment component is compliant with an approved aftertreatment system configuration for the engine 104.

Logic for ECM 116 can be programmed in the compliance manager 125 to monitor and determine whether the correct or approved aftertreatment component has been installed in the aftertreatment system 112 for a particular engine 104. The compliance manager 125 receives input signals from one or more of the connection devices 130 associated with one or more of the components 118, 120, 122, 124. The indicator device 149 of connection device 130 allows the ECM 116 to identify a part number, serial number or other identifier of the associated component of aftertreatment system 112, such as SCR catalyst 124, and determine whether it is approved for use in the aftertreatment system 112 for the engine 104 with which it is installed. Connection device 130 allows the identification of aftertreatment components to be made without using additional input/output channels on the ECM to read connection device 130, requiring additional wiring between OEM connection 129 and the sensor 134, or requiring additional wiring between the ECM 116 and the OEM interface 129.

In the embodiment of FIGS. 6A-6B, the connection device 130 includes one or more internal capacitors 146 to allow the ECM 116 to detect the capacitance value of the capacitors 146 and confirm that the correct aftertreatment component has been installed for the particular aftertreatment system 112 and engine 104. The use of an indicator device 149 with capacitors 146 in parallel with existing sensors 134 generally reduces the need for extra wiring on the OEM side and the need for additional ECM sensor channels. In arrangements using sensors 134 that are temperature sensors, the time constant of the temperature sensors, such as thermistors, is sufficiently longer than the parallel capacitors 146 such that the capacitors 146 should have no impact on the system measurement of temperature from the sensors 134.

In one embodiment of operation, the ECM 116 varies current through connection device 130 by switching values of internal resistors (not shown) of the ECM. The ECM 116 is thus able to electrically read the response time of each capacitor 146 and translate that response time into a capacitance value. As shown in FIG. 3, the ECM 116 may include a table 152 of capacitance values 156 in memory 206 that correspond to aftertreatment components approved for use in an aftertreatment system for a particular engine 104. The determined capacitance values generated by indicator device 149 are matched to the tabulated values in table 127 to determine if the aftertreatment component is approved to ensure compliance. The generation of the correct combination of unique capacitance values by indicator device 149 allows the controller to confirm the correct component 118, 120, 122, 124 has been installed for the aftertreatment system 112 designed for engine 104. If an incorrect combination of capacitance values is detected, a fault code 150 is enabled alerting the assembler that aftertreatment system 112 is not assembled in a compliant manner.

In one implementation of the systems and devices disclosed herein, the EPA may require proof that the assembly of components of an aftertreatment system and their use with certain engine types and/or certain aftertreatment system types has been completed in a way that complies with certification. When a supplier of an aftertreatment system is not the party that assembles the aftertreatment system with the engine, the EPA may require proof that the assembly has been completed in a way that certifies compliance with EPA regulations. The existing certification process can be time consuming and difficult to implement due to the various tracking and reporting requirements between different entities, each of which may have different stakes in the outcome of the certification. In addition, monetary penalties can result, for example, due to improper installations or when an aftertreatment system is incorrectly certified. The systems and methods disclosed herein allow aftertreatment system providers, engine providers, and others to ensure that the end-use of the engine and aftertreatment components is in compliance with EPA regulations and other requirements by allowing the installed components to be automatically identified and compared to a list of approved components for the particular aftertreatment system to be installed for a particular engine.

Proper aftertreatment components to be included in a compliant aftertreatment and engine system are typically coordinated with the engine calibration and can be stored in the controller 116 before assembly. Some components in the aftertreatment system (e.g., the dosing unit, NOx sensors) communicate via datalinks between the component and the ECM and provide readily available channels for verification that the components of the system are compatible. For other types of aftertreatment components, such as the DOC 118, DPF 120, doser 122, and SCR catalyst 124, typically there is no datalink means of communication with the ECM. Thus, an OEM or other party could install these types of components in an aftertreatment system without means for detection a non-compliant assembly with a particular engine 104.

Some manufacturers install temperature sensors (thermistors) on the DPF and SCR catalyst sections and other aftertreatment components, but these sensors typically include common sensor part numbers and are not distinguishable between the components on which they are installed. According to one embodiment disclosed herein, a connection device 128, 130 includes an indicator device 133, 149 connected with or in parallel to a sensor 134 placed on the aftertreatment component for the purpose of component identification. Installation of the connection device 128 with the indicator device 133 in parallel with existing sensors generally requires additional wiring from the connection device 128 to the OEM connection 129 typically associated with the engine 104 and ECM 116, additional wiring between the ECM 116 and the OEM connection 129 to communicate the component identification to the ECM 116, and the consumption of additional ECM sensor channel(s) to read the component identification generated by connection device 128.

According to another embodiment disclosed herein, connection device 130 is provided that is a capacitor type sensor connected in parallel with the existing sensor 134 typically mounted to an aftertreatment component, such as a temperature sensor of the catalyst section. This embodiment of the connection device 130 can use the same wires and ECM channels as the temperature (or other) sensor 134 to which it is connected, and thus does not increase the number of wires, sensors, or datalinks required and does not significantly impact performance of sensor 134. Moreover, assembly costs are lowered through reduced wiring and preservation of sensor channels for future use. In either of the embodiments of connection device 128, 130 discussed herein, OEMs and other parties typically would not need to report the engine serial number and aftertreatment component serial number combinations to certify an assembly meets regulations since the connection device 128, 130 is pre-configured to provide this information to an ECM 116 that is programmed to determine if the particular aftertreatment component with which the connection device 128, 130 is provided is approved for assembly to the engine 104 with which the ECM 116 is associated.

In one aspect of the present application, a system includes an internal combustion engine with a controller to control operation of the internal combustion engine. The system also includes an aftertreatment system coupled to the internal combustion engine to receive an exhaust gas stream from the internal combustion engine. The aftertreatment system includes at least one component for treatment of unwanted constituents in the exhaust gas stream and the component includes a sensor associated therewith. The system further includes at least one connection device associated with the component that is electrically connected to the controller. The connection device includes an indicator device configured to provide an input signal to the controller. The controller is structured to determine, based on the input signal, whether the component is approved for use with the internal combustion engine.

Features of the system may include, but are not limited to, one or more of the following: the connection device is connected in parallel with a sensor associated with the aftertreatment component and the controller; the connection device is mounted to the sensor and separately electrically connected to the controller; an indicator device that is a resistor or a capacitor; a controller that is configured to calculate a capacitance value associated with the component; a sensor that is a temperature sensor; a component that is at least one of a SCR catalyst and a DPF; a handheld diagnostic device to read an output signal from the controller where the output signal indicates whether the component is compliant; and/or a vehicle to carry the internal combustion engine, the controller, the aftertreatment system, and the connection device.

In another aspect of the present application, a method comprises: receiving, with a controller, an input signal from a connection device associated with an aftertreatment component in an aftertreatment system for an internal combustion engine; determining at least one of a resistance value and a capacitance value as a function of the input signal, wherein the at least one of the resistance value and the capacitance value corresponds to an aftertreatment component identification; and determining whether the identified aftertreatment component is compliant for use with the internal combustion engine by determining if the identified aftertreatment component is included with a list of approved aftertreatment components stored in the controller.

Features of the method may include, but are not limited to, one or more of the following: transmitting a fault code if the aftertreatment component is not compliant with the correct aftertreatment system; reading the fault code with a handheld diagnostic device; carrying the controller, the aftertreatment system, and the internal combustion engine with a vehicle; the connection device including a resistor that provides a unique resistance value for the component; and the connection device including one or more capacitors that provide one or more unique capacitance values for the component.

In yet another aspect of the present application, an apparatus includes means for receiving an input signal associated with an aftertreatment component through a connection device in an aftertreatment system for an internal combustion engine. The apparatus also includes means for calculating at least one of a resistance value and a capacitance value as a function of the input signal, where the at least one of the resistance value and the capacitance value identifies the component in the aftertreatment system; and means for determining whether the aftertreatment component is compliant with approved aftertreatment components for the particular aftertreatment system to be installed with the engine. In one specific embodiment, the means includes an electronic control module that controls an internal combustion engine.

Features of the apparatus may include, but are not limited to, one or more of the following: a connector that includes a mounting portion configured to mount the connection device with a sensor associated with the aftertreatment component; a harness for connecting the connection device in electrical parallel with a sensor associated with the aftertreatment component; a controller that transmits a fault code if the aftertreatment component is not compliant; a display for displaying the fault code; a vehicle for carrying the controller, the aftertreatment system, and the internal combustion engine; and an aftertreatment component that is at least one of an SCR catalyst and a DPF.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   an internal combustion engine;
   a controller to control operation of the internal combustion engine;
   an aftertreatment system coupled to the internal combustion engine to receive an exhaust gas stream from the internal combustion engine, the aftertreatment system including at least one component for treatment of constituents in the exhaust gas stream, wherein the at least one component includes a sensor associated therewith; and
   a connection device associated with the at least one component that is electrically connected to the controller, the connection device including a housing and an indicator device in the housing that is connected between the sensor and the controller with a wiring harness, the indicator device including one or more capacitors in parallel with the sensor and the controller, the one or more capacitors configured to generate an input signal to the controller corresponding to a unique capacitance value that identifies the at least one component, wherein the controller is configured to determine, based on the input signal, whether the at least one component is approved for use with the internal combustion engine.

2. The system of claim 1, wherein the sensor includes a junction box connected to the wiring harness.

3. The system of claim 1, wherein the one or more capacitors are electrically connected to wires of the wiring harness, and the wires are further electrically connected to the sensor and electrically connected to the controller.

4. The system of claim 1, wherein the sensor is a temperature sensor.

5. The system of claim 1, wherein the controller is configured to determine the capacitance value that identifies the at least one component by switching values of internal resistors of the controller to vary electrical current through the indicator device and reading a response time of the capacitor.

6. The system of claim 1, wherein the at least one component is a selective catalytic reduction catalyst.

7. The system of claim 1, wherein the at least one component is a diesel particulate filter.

8. The system of claim 1, further comprising a vehicle configured to carry the internal combustion engine, the controller, the aftertreatment system, and the connection device.

9. The system of claim 1, wherein the controller includes a memory, the memory including a table of identifiers of approved aftertreatment components for the engine and the controller is configured to compare the identification of the at least one component determined from the indicator device with the approved aftertreatment component identifiers and indicate whether the at least one component is approved for use with the internal combustion engine.

10. A method, comprising:
receiving, with a controller, an input signal from a connection device associated with art aftertreatment component in an aftertreatment system for an internal combustion engine, wherein the aftertreatment component includes a sensor associated therewith and the connection device includes a housing and an indicator device in the housing, the indicator device being connected between the sensor and the controller with a wiring harness, the indicator device including one or more capacitors in parallel with the sensor and the controller;
determining a capacitance value from the one or more capacitors as a function of the input signal, wherein the capacitance value corresponds to an aftertreatment component identification; and
determining whether the identified aftertreatment component is compliant for use with the internal combustion engine by determining if the identified aftertreatment component is an approved aftertreatment component stored in a memory of the controller.

11. The method of claim 10, further comprising:
transmitting a fault code if the aftertreatment component is determined not approved for use with the internal combustion engine.

12. The method of claim 10, further comprising carrying the controller, the aftertreatment system, and the internal combustion engine with a vehicle.

13. The method of claim 10, wherein the sensor includes a junction box connected to the wiring harness.

14. The method of claim 10, wherein the one or more capacitors are electrically connected to wires of the wiring harness, and the wires are further electrically connected to the sensor and electrically connected to the controller.

15. The method of claim 10, wherein the connection device includes a programmed code that identifies the aftertreatment component.

16. An apparatus, comprising:
an aftertreatment system including at least one aftertreatment component and a controller including a memory, wherein the at least one aftertreatment component includes a sensor and a connection device associated therewith, the connection device including a housing and an indicator device in the housing that is connected between the sensor and the controller with a wiring harness, the indicator device including one or more capacitors in parallel with the sensor and the controller, wherein the controller is configured to:
receive an input signal from the connection device associated with the at least one aftertreatment component;
determine a capacitance value of the one or more capacitors as a function of the input signal, wherein the capacitance value identifies the at least one aftertreatment component in the aftertreatment system; and
determine whether the identified at least one aftertreatment component is compliant from a list of approved aftertreatment component identifiers stored in the memory that are associated with the aftertreatment system.

17. The apparatus of claim 16, wherein the connection device is mounted to a junction box of the sensor associated with the at least one aftertreatment component with the wiring harness.

18. The apparatus of claim 17, wherein the one or more capacitors are electrically connected to wires of the wiring harness, and the wires are further electrically connected to the sensor and electrically connected to the controller.

19. The apparatus of claim 16, wherein the at least one aftertreatment component is at least one of a selective catalytic reduction catalyst and a diesel particulate filter.

* * * * *